United States Patent [19]

Westerlund

[11] Patent Number: 4,709,842

[45] Date of Patent: Dec. 1, 1987

[54] TOOL FOR FASTENING AN ELONGATED OBJECT ON A SUPPORTING SURFACE BY MEANS OF U-SHAPED CLIPS

[75] Inventor: Bengt A Westerlund, Hestra, Sweden

[73] Assignee: Isaberg AB, Hestra, Sweden

[21] Appl. No.: 873,378

[22] Filed: Jun. 12, 1986

[30] Foreign Application Priority Data

Jun. 20, 1985 [SE] Sweden ........................... 8503074

[51] Int. Cl.$^4$ ........................... B25C 5/11; B25C 7/00
[52] U.S. Cl. ........................... 227/120; 227/109; 227/119; 227/149
[58] Field of Search ........... 227/109, 114, 119, 120, 227/DIG. 10, 43, 140, 149, 147

[56] References Cited

U.S. PATENT DOCUMENTS

| | | | |
|---|---|---|---|
| 2,137,642 | 11/1938 | Cavanagh | 1/49 |
| 2,397,872 | 4/1946 | Kovacs | 227/146 |
| 2,435,142 | 1/1948 | Kovacs | 227/146 |
| 4,003,417 | 1/1977 | Cornwell | 227/149 |
| 4,537,343 | 8/1985 | Johansson | 227/120 |

FOREIGN PATENT DOCUMENTS

| | | |
|---|---|---|
| 2213189 | 10/1972 | Fed. Rep. of Germany . |
| 148401 | 6/1983 | Norway . |
| WO82/03196 | 9/1982 | PCT Int'l Appl. . |
| WO83/03721 | 10/1983 | PCT Int'l Appl. . |

Primary Examiner—E. R. Kazenske
Assistant Examiner—James L. Wolfe
Attorney, Agent, or Firm—Shapiro and Shapiro

[57] ABSTRACT

A tool for fastening an elongated object on a supporting surface with U-shaped clips, each embracing the elongated object and being secured to the supporting surface by a fastening member extending through one of its legs. The tool comprises a magazine for receiving a succession of clips to be successively fed through the magazine, a feed device which is adapted to feed the succession of clips in a direction towards a determined mounting position at the front end of the tool, and a driving device with a driver for driving the fastening member of a clip in the mounting position into the supporting surface. The magazine is designed to receive the clips with their fastening members in such an orientation that each clip has its U-legs disposed after each other in the longitudinal direction of the magazine so that it may be secured over the elongated object oriented transversely of the longitudinal direction of the magazine. A stop arrangement on the front end of the magazine determines the mounting position and is adapted to arrest the foremost clip of the succession of clips in a protruding state at the mounting position and to align the fastening member of this clip with respect to the driver.

6 Claims, 8 Drawing Figures

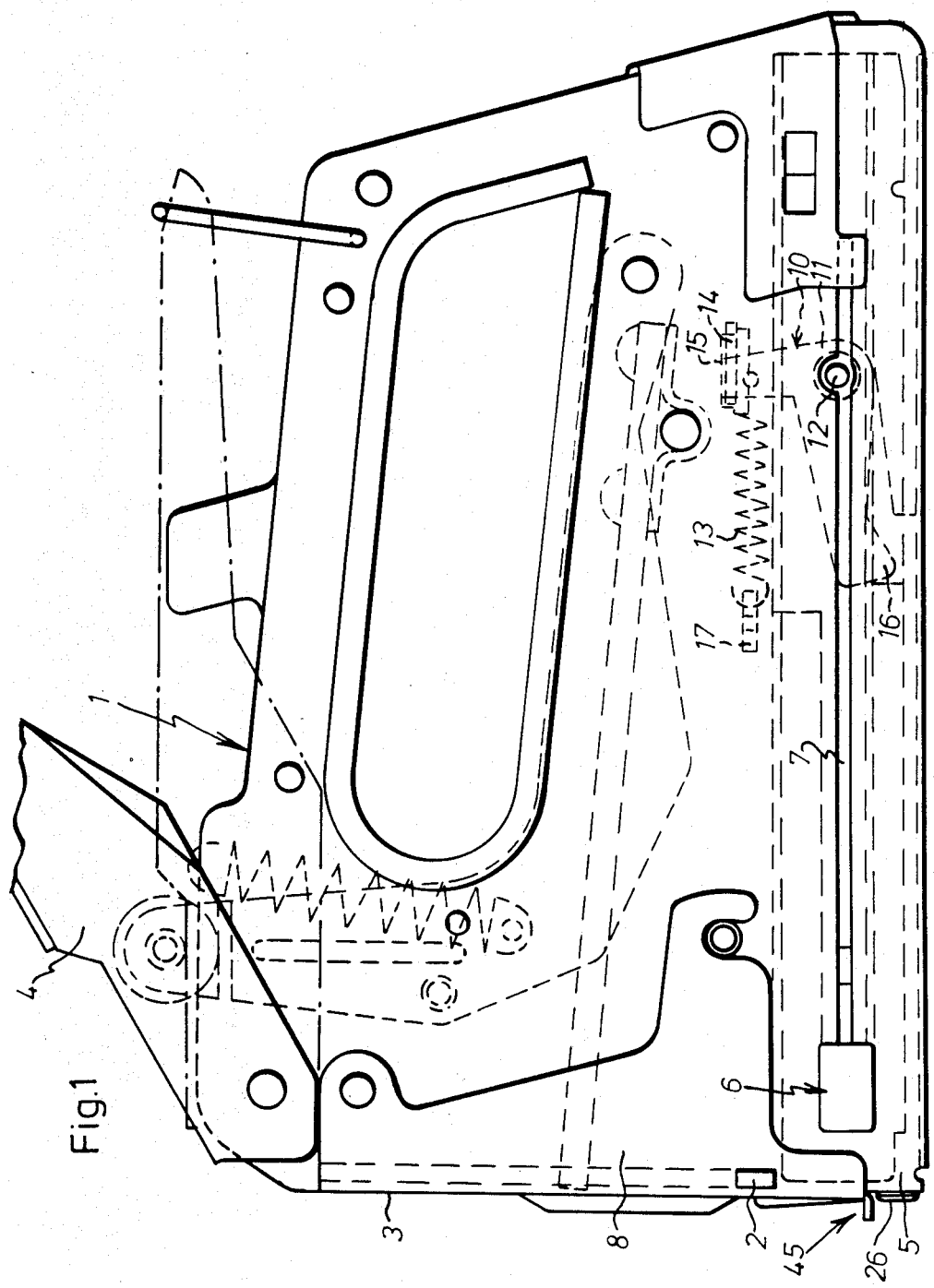

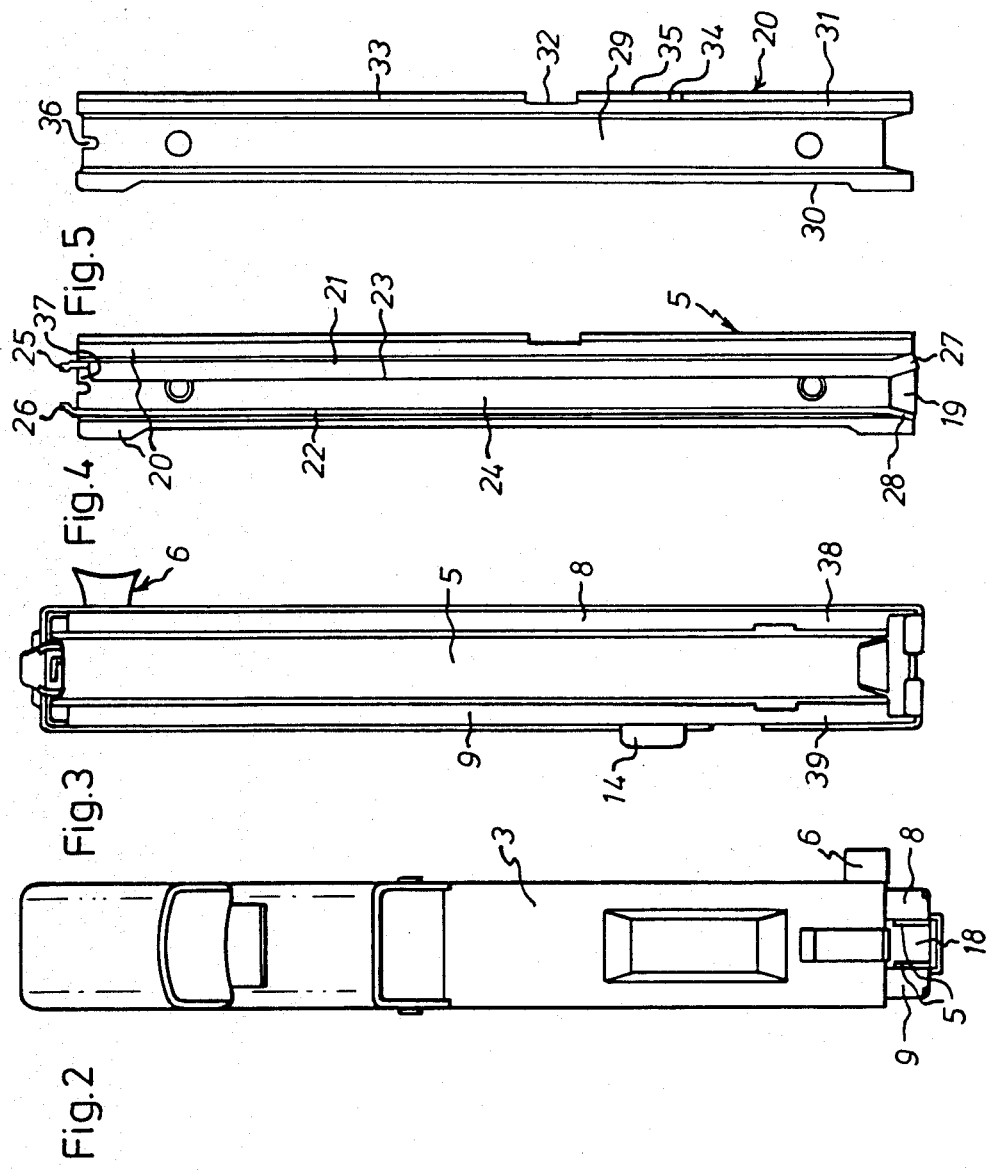

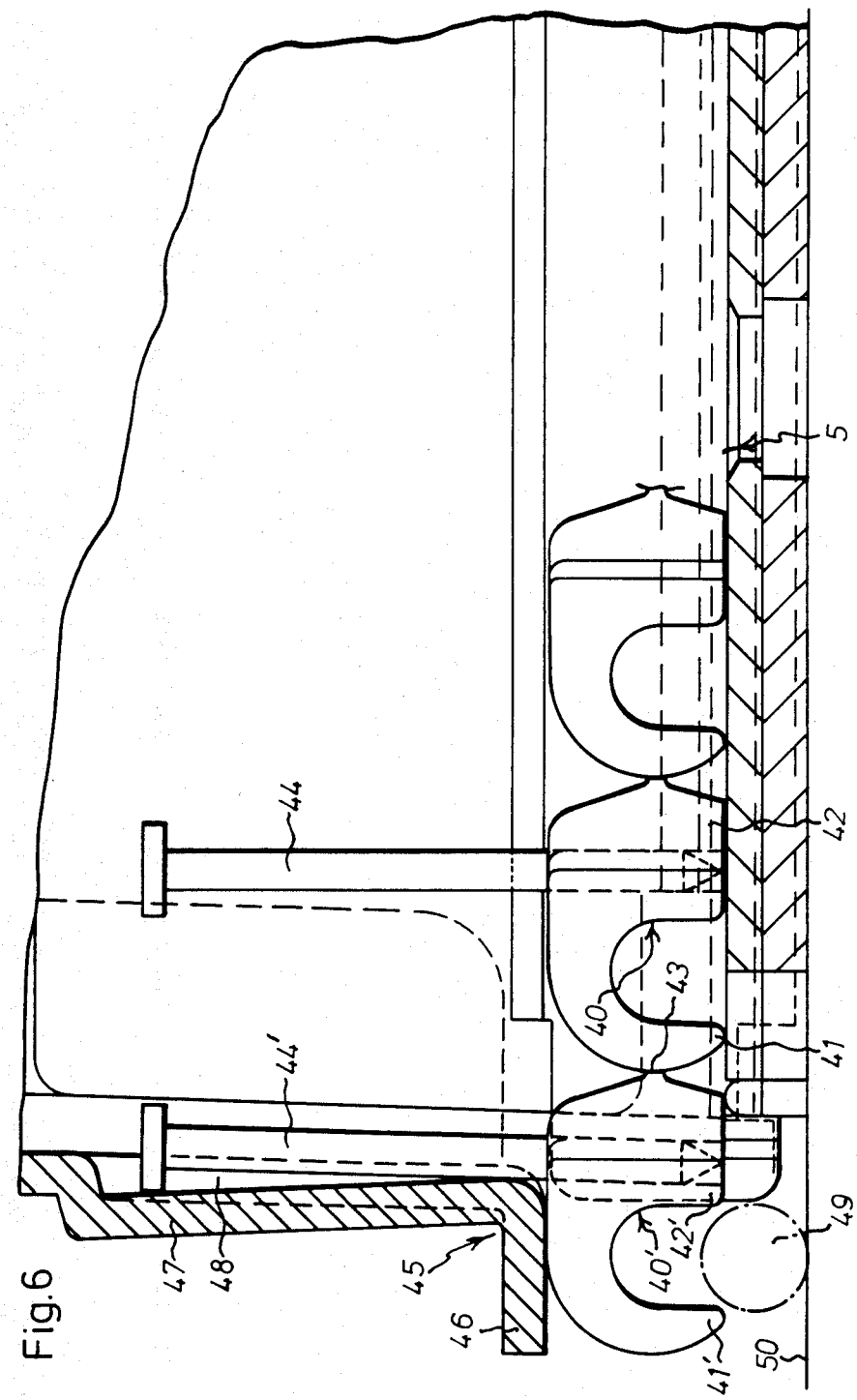

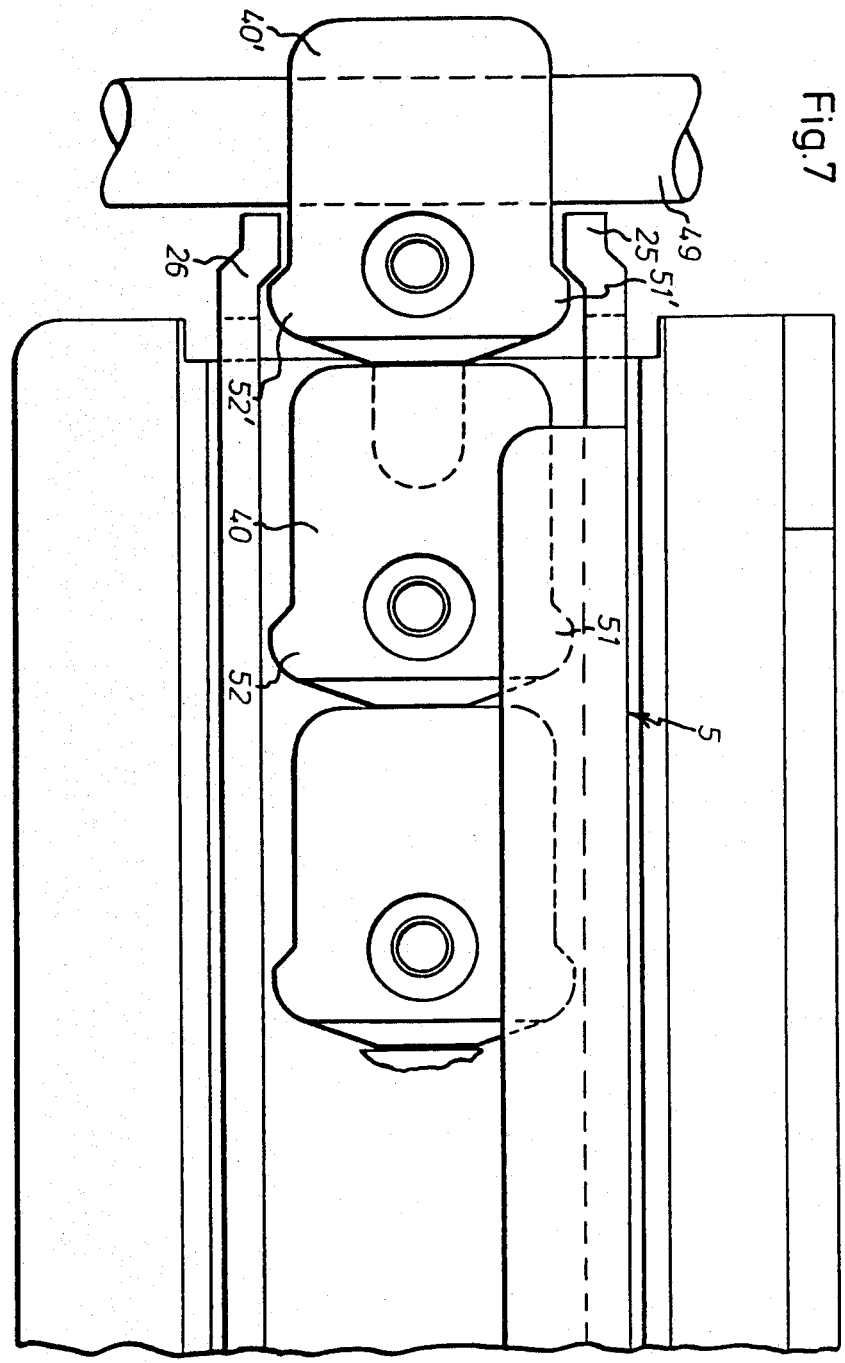

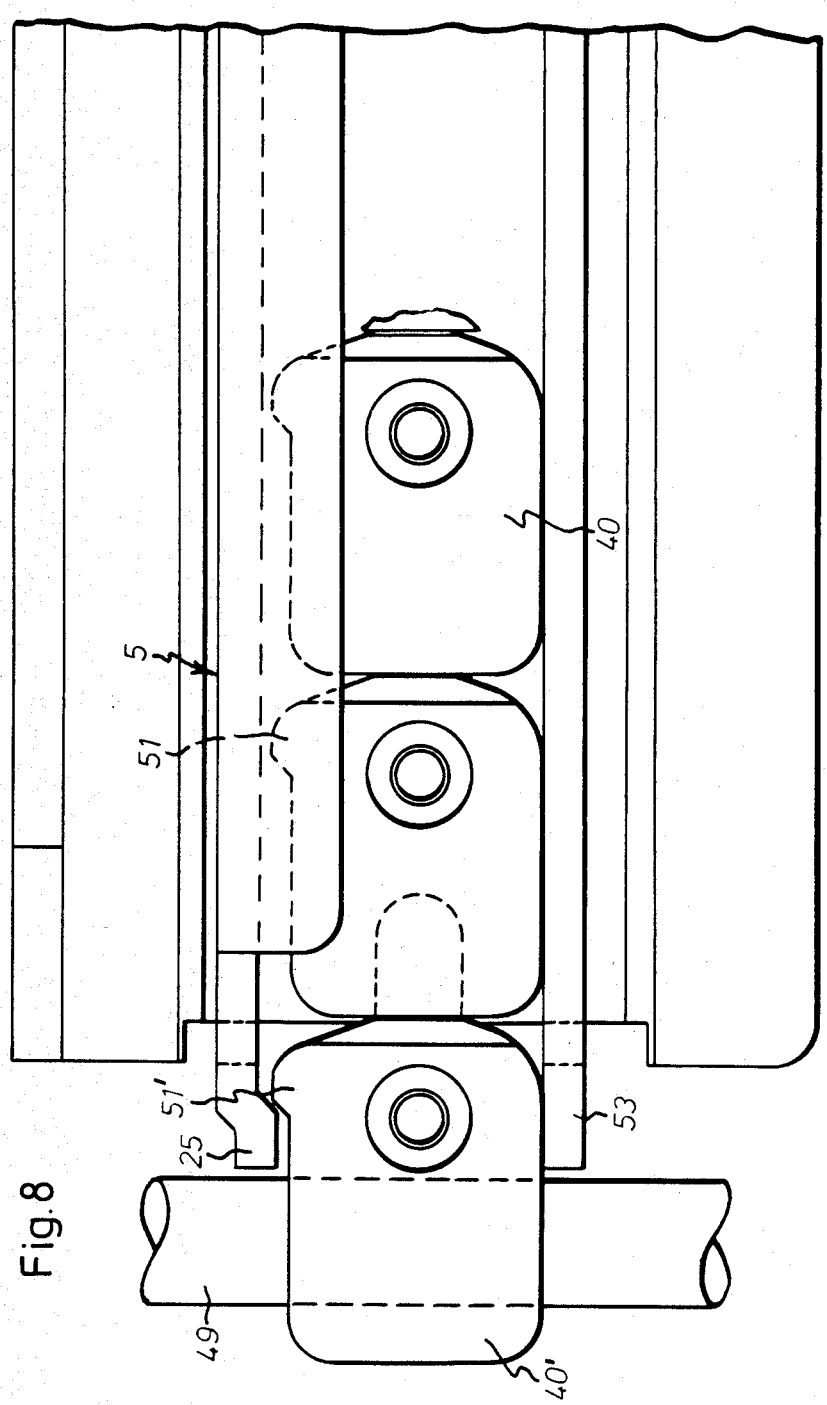

TOOL FOR FASTENING AN ELONGATED OBJECT ON A SUPPORTING SURFACE BY MEANS OF U-SHAPED CLIPS

The present invention relates to a tool for fastening an elongated object on a supporting surface by means of U-shaped clips which are intended to embrace the elongated object and, by means of a fastening member extending through one leg of the clip, to be secured to the supporting surface. The tool comprises a magazine for receiving a succession of clips to be successively fed through said magazine, a feed device which is adapted to feed the succession of clips in a direction towards a determined mounting position at the front end of the tool, and a driving device with a driver for driving the fastening member of a clip when in said mounting position, into the supporting surface. The magazine is designed to receive the clips provided with their fastening members in such an orientation that each clip has its U-legs disposed after each other in the longitudinal direction of the magazine, so that the clips may be secured over an elongated object oriented transversely of the longitudinal direction of the magazine. More particularly, the invention relates to a tool for fastening clips over electric wires, telephone wiring, cables, hoses or the like.

Such a tool is shown and described in PCT publication WO No. 83/03721, for example, and includes a stop member adapted to arrest the foremost clip of the succession of clips in a substantially freely protruding state in the mounting position and to align the fastening member of this clip with respect to the driver. This tool constitutes a considerable improvement over prior tools since it makes it possible to operate quite close to a wall since the clips are disposed after each other in the longitudinal direction of the magazine instead of the transverse direction thereof. This tool suffers, however, from several drawbacks which have appeared to be a consequence of the fact that the abutment member can lock the foremost clip of the succession of clips in the longitudinal direction, but not in the transverse or vertical direction. This means, inter alia, that this clip will tilt forward when urged by the subsequent clips, and thus the fastening member of the clip is not always correctly aligned exactly below the driver of the driving device.

A further drawback of the prior art tool because of the risk of tilting of the foremost clip is that the succession of clips cannot be a succession of separate clips but must be a strip of clips where the different clips are interconnected by means of joints. This is so because the stop member in the prior art tool only has an arresting function and does not retain the foremost clip in the transverse or vertical direction. Therefore, the clip will drop out of the magazine if it is not retained in the vertical or transverse direction by some other means - for example a breakable connection with the next clip in the succession of clips. In the prior art tool, the last clip of the strip of clips will in most cases drop out of the magazine before it has been applied over the elongated object oriented transversely of the longitudinal direction of the magazine.

A still further drawback of the prior art tool is that in order to accomodate different clip dimensions the abutment member must be exchangeable or adjustably mounted on the tool. This means that the magazine must be designed such that clips of different widths can be used in one and the same magazine, which again means that the construction of the magazine will be quite complicated.

One object of the present invention is to prevent the foremost clip in the succession of clips from tilting forward when urged by the other clips in the succession of clips and to prevent its fastening member from being inclined.

U.S. patent specification No. 2,137,642, PCT publication WO No. 82/03196 and Norwegian Patent Specification No. 148,401 disclose further tools for fastening objects to a supporting surface by means of clips. In particular, Norwegian Patent Specification No. 148,401 discloses a tool for fastening U-shaped clips over, for example, wires, said clips having their U-legs disposed after each other in the longitudinal direction of the magazine.

A further object of the present invention is to eliminate the need of interconnecting the clips in the succession of clips by means of joints, i.e. it should be possible to load the magazine with both individual loose clips and strips of clips.

A still further object of the invention is to ensure that, after the first impact of the driver on the clip in the mounting position thereof, the position of the clip relative to the tool should remain unchanged such that repeated strokes by the driver can be carried out, if necessary, in order to drive the fastening member of the clip into a solid supporting surface. A new clip is fed to the mounting position only after the tool has been lifted off from the clip applied.

Another object of the invention is to provide a tool which can be adapted to different clip dimensions in that the magazine is interchangeably mounted on the tool. This means, inter alia, that a relatively simple design of the magazine is obtained since each magazine is only used for one clip width, and that the main part of the tool can remain unchanged as the clip dimension is changed.

According to the invention, these and further objects are achieved in that the tool of the type mentioned by way of introduction has the characteristic features stated in the appended main claim. The subclaims define particularly preferred embodiments of the invention.

The invention will be described in greater detail hereinbelow with reference to the accompanying drawings in which:

FIG. 1 is a side view of a tool according to the present invention;

FIG. 2 is a front view of the tool in FIG. 1;

FIG. 3 is a bottom view of the tool in FIG. 1;

FIG. 4 is a top plan view of a magazine for the tool in FIG. 1;

FIG. 5 is a top plan view of a bottom plate of the magazine in FIG. 4;

FIG. 6 is a longitudinal section of the lower portion of the tool in FIG. 1 when a strip of clips is placed in its magazine;

FIG. 7 is a top plan view of the strip of clips and the magazine in FIG. 6; and

FIG. 8 shows a further embodiment of the strip of clips and the magazine according to the invention.

The tool illustrated in FIG. 1 is in principle designed as a conventional staple tacker but has a modified magazine, a modified feed device and a modified driving device. The handle and body portion 1 of the tool, including a drive mechanism for a driver 2, is entirely conventional and may for instance be of the basic type as disclosed in U.S. Pat. No. 2,137,642 to which reference is now made. A more detailed description of these tool components will therefore not be made.

The driver 2 of the tool is adapted to move in a path adjacent the front edge 3 of the tool and is modified as compared with the driver of a conventional staple tacker, which rather resembles a blade. Thus, in the embodiment shown, the driver is planar.

FIG. 1 further shows that a magazine 5, which will be described in more detail below, is placed in the bottom portion of the tool, and that a device 6 for feeding clips 40 (see FIG. 6) through the magazine 5 is mounted around a groove 7 in one of the two side edges 8, 9 of the body 1, more specifically in the side edge 8. The groove 7 is provided a certain distance above the upper edge of the magazine 5, said distance being selected such that the feed device 6 engages only with the nails 44 of the clips 40 extending above said edge. The feed device 6 is in principle designed as the feed device 35 disclosed in PCT publication WO No. 83/03721, except that the feed device 6 is not arranged in the magazine 11 of the tool, as in this prior art tool, but is mounted, according to the present invention, in the tool body 1, as mentioned above.

A means 10 for locking and releasing the magazine 5 (said means being indicated by dashed lines in FIG. 1) is arranged in the tool body 1 on the side edge 9. The locking and releasing means 10 comprises an arm 11 which is pivotally connected with the side edge 9 on the inner surface thereof by means of a pivot pin 12 and a tension spring 13. The arm 11 is provided, at its upper end, with a handle 14 extending from the inside to the outside of the tool through a groove 15 in the side edge 9 and, at its lower end, with a shoulder 16. The tension spring 13 is, at its front end, attached to the upper portion of the arm 11 immediately below the handle 14 and, at its rear end, to a protrusion 17 which is an inwardly bent strip of the side edge 9 and is located a certain distance in front of the groove 15 on a level therewith.

FIG. 2 shows that the lower end of the front edge 3 of the body 1 is located a certain distance above the lower end portions of the side edges 8, 9. It is further shown that the front portions of the lower end portions of the side edges 8, 9 are bent such that they extend a certain distance inwardly toward the centre of the front edge 3, the front end of the magazine 5 projecting through a groove 18 which is formed between the lower end of the front edge 3 and the front lower end portions of the side edges 8, 9.

FIG. 3 shows that the lower end portions of the side edges 8, 9 are bent transversely of the longitudinal direction of the side edges over the entire length thereof such that two guiding edges 38, 39 for the magazine 5 are formed along the underside of the body 1.

FIG. 4 shows the magazine 5 which consists of a substantially U-shaped channel member 19 and a bottom plate 20 fixed to the underside of the channel member. One side wall 21 of the channel member 19 is provided with an inwardly projecting longitudinal flange 23 which prevents the clips 40 from moving upwards away from the bottom 24 of the magazine 5 while being fed by the feed device 6. The two side walls 21, 22 of the channel member 19 are, at their front ends extending a certain distance beyond the bottom 24 of the magazine 5, each provided with a projecting guide 25, 26 and, at their rear ends, each provided with an outwardly inclined portion 27, 28 to facilitate the insertion of the clips 40 which are inserted through the rear end of the magazine 5. Each guide 25, 26 extends in the direction of movement of the driver 2 (vertically in FIG. 1).

As shown in FIG. 5, the bottom plate 20 consists of a bottom 29 and, spaced therefrom, two opposing, projecting flanges 30, 31, the latter flange 31 having a recess 32. On both sides of the recess 32, the flange 31 is provided with two upwardly extending edges 33, 34, the rear edge 34 comprising a bevelled portion 35 adjacent the recess 32. For reasons of manufacture, the bottom plate 20 and the channel member 19 are provided with a recess 36 and 37, respectively, at the front edge of the respective bottom 29, 24.

FIG. 6 shows a strip of clips consisting of U-shaped clips 40, the foremost clip in the strip of clips being designated 40'. (The clips will hereinafter be referred to using non-primed reference numbers except that when specific reference is made to the leading clip, primed number will be used.) Each clip 40 has its U-legs 41, 42 disposed after each other in the longitudinal direction of the magazine 5. The clips 40 are further interconnected by means of bridges 43 which are positioned approximately at the centre of the U-legs and are designed such that they can be easily broken or shorn apart from the clip portions connected therewith. Each clip 40 is provided with a nail 44 extending through the rear leg 42 of the clip 40 with respect to the direction of feed, the point of the nail 44 being even with the lower end surface of this leg 42.

An L-shaped abutment member 45 is disposed at the lower portion of the front edge 3 of the body 1 such that its one leg 46 extends perpendicularly away from the lower end surface of the front edge 3, while its other leg 47 extends along the front edge 3 above the leg 46, as shown. The leg 47 consists of a bead which is pressed out of the front edge 3 and the cavity of which, together with a groove (not shown) provided at the lower front end portion of the body (said groove being an extension of the groove 18 shown in FIG. 2), forms a channel-shaped member 48. The channel-shaped member 48 serves as guide means for the driver 2 of the tool (see FIG. 1) but also as a guide for centering the nail 44' of the clip 40' when in the mounting position, in relation to the driver 2.

FIG. 6, illustrating the foremost clip 40' in the mounting position, further shows that the lower surface of the protruding leg 46 of the abutment member 45 cooperates with the upper side of the front leg 41' of the foremost clip 40', while the nail 44' of the clip in this position cooperates with the inner surface of the leg 47 of the abutment member 45. FIG. 6 also shows that, in this position, the foremost clip 40' is located a certain distance above the elongated object 49 which, in this example is a cable to be secured to a supporting surface 50.

FIG. 7 shows that the leg 42 of each clip 40 comprises guiding portions or studs 51, 52 which are provided on the rear half of each side of the leg and which extend along the entire height thereof. In the mounting position, the guiding studs 51', 52' of the foremost clip 40' engage, as shown in FIG. 7, with the two guides 25, 26 of the magazine 5, and, because of this engagement, the magazine 5 is able to retain the clip in this position until the driver 2 drives the clip out of the magazine 5 along the guides 25, 26. FIG. 7 further shows that the inner width of the magazine 5 corresponds approximately to the width of the clip at the guiding studs.

FIG. 8 shows a further embodiment in which only one side wall 21 of the magazine 5 has been provided with a guide 25 and only one of the side edges of the leg 42 has been provided with a guiding stud 51. This guide and guiding stud are, of course, positioned on the same side of the body 1 and can engage with each other. The other side wall 22 of the magazine has been extended by a straight wall portion 53 cooperating with the side edge of the leg 42 which has no stud.

The operation of the tool will now be described with reference to FIGS. 1 to 7. The magazine 5 is inserted in the bottom portion of the body through the rear end thereof. At the same time, the flange 30 of the magazine 5 slides along a groove (not shown) within the body 1, said groove being positioned immediately above the guiding edge 38 while the other flange 31 of the magazine slides along the guiding edge 39. While the magazine 5 is being inserted, the shoulder 16 of the locking and releasing means 10 will be swung, against the action of the tension spring 13, upwardly by the front edge 33 of the flange 31 and then slide along the upper end surface of this edge until it makes contact with the recess 32. The action of the tension spring 13 will then cause the shoulder 16 to swing downwardly toward the lower portion of the recess, simultaneously as the front portion of the magazine 5 abuts against the front lower end portions of the side edges 8, 9, which are positioned on either side of the groove 18.

The locking and releasing means 10 is in this position situated as shown in FIG. 1, and from FIG. 1 it also appears that the front portion 35 of the edge 34 is bevelled to make it possible to swing the arm 11 and thus the shoulder 16 downwardly toward the recess 32. Because of its design, the shoulder 16 in this position prevents the magazine from being moved in a direction toward the rear portion of the body 1, but does not prevent the magazine from being moved in a direction toward the front portion of the body 1.

Then, the clips 40 are fed by means of the feed device 6 in the manner described in PCT publication WO No. 83/03721, and after said feeding, the foremost clip 40' is placed in the position shown in FIG. 6.

The driver 2 remains stationary in the raised resting position shown in FIG. 1 until the drive mechanism is triggered by pressing the handle 4, and is then forced downwards in a stroke movement which is achieved by means of a tensioned spring or some other type of drive means. In the stroke movement, the driver 2 drives the nail 44' of the clip 40' into the supporting surface 50 simultaneously as the clip is pushed out of the magazine 5 along the guides 25, 26 of the magazine such that the clip is secured around the cable 49.

Depending on the hardness of the supporting surface 50, more than one stroke against the nail 44' of the same clip 40' may be required before the nail 44' is completely driven in, the connection 43 is broken, and the clip 40' is sufficiently secured over the elongated object 49.

The feed device 6 then feeds the next clip which in FIG. 6 is positioned after the clip 40', to the mounting position shown, and a new driving-in process is initiated.

The feed device 6 then in turn feeds all clips in the magazine 5, and in contrast to the tool according to the above-mentioned PCT publication, the last clip of the strip is also retained in the mounting position until it is pushed out of the magazine 5 by the driver 2.

Subsequently, the magazine is loaded with a new strip of clips, and the entire process described above is repeated.

It will be appreciated that the invention is not limited to the embodiment shown and described, but may be modified in various manners within the scope of the appended claims. As mentioned above, it is a great advantage that the magazine can be loaded with individual clips instead of strips of clips, without impairing the function of the tool.

In the preferred embodiments the guiding studs are provided on the rear leg of the clip as seen in the direction of feed, but other embodiments may have the studs provided on the front leg of the clip as seen in the direction of feed.

What I claim and desire to secure by Letters Patent is:

1. A fastening tool for use with U-shaped clips of a type which has a fastening member extending through a leg of the clip and drivable into a supporting surface with the clip embracing an elongate object such as a wire or cable on the supporting surface so as to fasten said object to said supporting surface and which also has a guide portion protruding laterally from at least one side of one leg of the clip, said tool including a magazine for receiving a succession of said clips carrying respective fastening members with the clips oriented such that the respective U-legs of each clip are disposed one after the other in the longitudinal direction of the magazine, feeding means for feeding the clips in the magazine successively to a predetermined mounting position at a front end of the tool, and driving means having a driver for driving the fastening member of a clip at said mounting position into said supporting surface such that that clip is secured over the elongated object and to the supporting surface with the elongated object being oriented transversely of the longitudinal direction of the magazine, said magazine having stop means including a guide member extending in a direction of stroke of said driver and disposed to arrest the foremost clip in succession in a protruding state at said mounting position such that the fastening member of that clip is aligned with said driver and to engage the laterally protruding guide portion of the clip in said mounting position.

2. The tool as claimed in claim 1, wherein said stop means includes a pair of said guide members respectively disposed to engage protruding guide portions on either side of said one leg of the clip in said mounting position.

3. The tool as claimed in claim 1, wherein the tool comprises an abutment member having channel-shaped guide means facing the magazine and oriented in the direction of stroke of the driver, for centering the fastening member of the clip in said mounting position.

4. The tool as claimed in claim 3, wherein the channel-shaped guide means of the abutment member serves as a guide for the driver.

5. The tool as claimed in claim 1, wherein the magazine with its stop member is interchangeably mounted on the tool to allow adaptation of the tool to different clip dimensions.

6. The tool as claimed in claim 1, wherein the magazine, the stop means and the driver are constructed for cooperation with a succession of clips in which the fastening members extend through the rear leg of the clip with respect to the direction of feed.

* * * * *